3,020,297
Patented Feb. 6, 1962

3,020,297
2α,6α-DIMETHYLHYDROCORTISONE AND THE 21-ACYLATES THEREOF
Frank H. Lincoln, Jr., George B. Spero, and John L. Thompson, Kalamazoo, Mich., assignors to The Upjohn Company, Kalamazoo, Mich., a corporation of Delaware
No Drawing. Filed Nov. 12, 1959, Ser. No. 852,204
3 Claims. (Cl. 260—397.45)

This invention relates to 2α,6α-dimethylhydrocortisone and the 21-acylates thereof having the following formula:

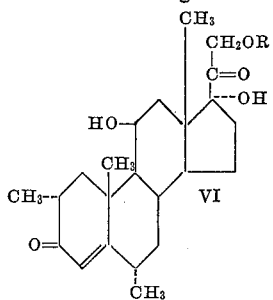

wherein R is hydrogen or the acyl radical of a hydrocarbon carboxylic acid containing from one to twelve carbon atoms, inclusive.

The invention further relates to methods for the preparation of the above novel compounds.

The novel compounds of this invention possess pharmacological activtiy, in particular glucocorticoid activity and anti-inflammatory activity. They are active in the free alcohol or 21-acyloxy form, particularly the 21-acetoxy and those 21-acyloxy componds wherein the acyl group is that of an alkyl dicarboxylic acid such as the 21-dimethylglutarate and the 21-hemisuccinate compound. The compounds are notable in their intensity of pharmacological activity, 2α,6α-dimethylhydrocortisone acetate being considerably more than ten times as active as hydrocortisone as a glucocorticoid yet possessing little or no mineralocorticoid activity.

According to the method of the present invention, the novel compounds can be prepared by methods represented by the following formulae:

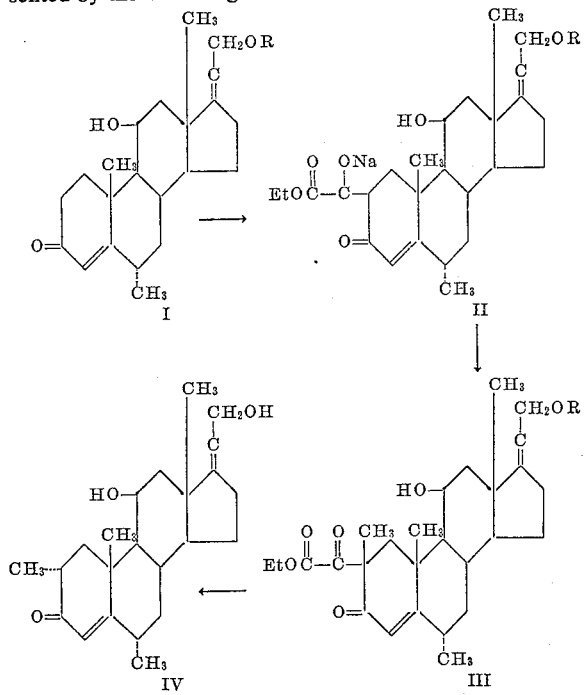

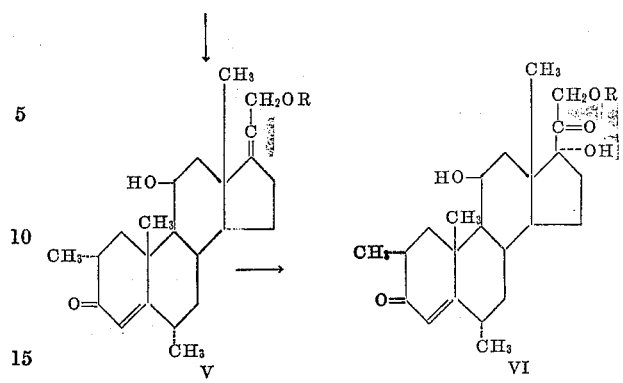

In the above formulae, R is hydrogen or the acyl radical of a hydrocarbon carboxylic acid of from one to twelve carbon atoms, inclusive. In place of the ethoxyoxalyl radical shown in the above formulae, the formyl, lower-alkoxyoxalyl or the trifluoroacetyl can be employed as will be shown below.

According to the present invention, 11β,21-dihydroxy-6-methyl-4,17(20)-pregnadien-3-one or a 21-ester thereof (I), preferaby the 6α-epimer thereof, as disclosed by Spero et al. in J. Am. Chem. Soc., 78, 6313, is converted to the novel steroids of the present invention by the production of a 2-carbonyl derivative (II), subsequent methylation thereof to produce the corresponding 2-methyl-2-carbonyl compound (III), subsequent removal of the 2-carbonyl group to produce the 2-methyl compound (IV), esterification of the thus-produced 21-hydroxy compound to produce a 21-esterified compound (V) and oxidative hydroxylation of the $\Delta^{17(20)}$-double bond to produce 2α,6α-dimethylhydrocortisone acylate (VI). Hydrolysis of the 21-ester group of Compound VI, e.g., with aqueous sodium bicarbonate in methanol, is productive of the corresponding 21-hydroxy compound.

Starting with 21-acetoxy-6α-methyl-4,17(20)-pregnadiene-3,11-dione, or other 21-esters thereof which can be prepared by the oxidation with chromic acid of the corresponding 21-ester of 11β,21-dihydroxy-6α-methyl-4,17(20)-pregnadien-3-one (V), and proceeding with the reactions described above, there is produced the corresponding 21-ester of 2α,6α-dimethyl-17α,21-dihydroxy-4-pregnene-3,11,20-trione. This compound can also be produced by oxidation of VI.

These steroids also possess remarkable cortical hormone activity, and especially outstanding among these compounds are 2α,6α-dimethyl-17α,21-dihydroxy-4-pregnene-3,11,20-trione and the 21-esters thereof wherein the acyl group is lower-acyloxy, preferably acetoxy, or the acyl radical of a dicarboxylic acid as described in connection with Compound VI.

The novel 2α,6α-dimethyl - 11β,17α-dihydroxyl-21-acyloxy-4-pregnene-3,20-diones of the present invention can be converted to other novel hormonal synthetic steroids possessing glucocorticoid activity by the following reactions, exemplified by the reaction of 2α,6α-dimethyl-11β,-17α - dihydroxy-21-acetoxy-4-pregnene-3,20 - dione. Dehydration of this compound, for example, by reaction with a dehydrating agent, e.g., para-toluene sulfonic acid or alkylsulfonyl chloride in the presence of dimethylformamide, POCl₃ in pyridine, HCl in acetic acid, acetic or formic acid in the presence of BF₃, and N-haloamide or N-haloimide and SO₂ in pyridine; is productive of 2α,-6α-dimethyl - 17α-hydroxy-21-acetoxy - 4,9(11)-pregnadiene-3,20-dione which, when reacted with a molar equivalent of N-bromoacetamide in tertiary butyl alcohol under aqueous conditions and in the presence of perchloric acid catalyst, is converted to 2α,6α-dimethyl-9α-bromo-11β,17α - dihydroxy-21-acetoxy-4-pregnene-3,20 - dione.

Reaction of this latter compound with sodium acetate in acetone is productive of 2α,6α-dimethyl-9β,11β-oxido-17α-hydroxy-21-acetoxy-4-pregnene-3,20-dione. Addition of hydrogen fluoride to this compound, for example, with a methylene chloride solution of a molecular equivalent of hydrogen fluoride at minus fifteen degrees centigrade or in liquid fifty percent aqueous HF at room temperature, is productive of 2α,6α-dimethyl-9α-fluoro-11β,-17α-dihydroxy-21-acetoxy-4-pregnene-3,20-dione. Substitution of hydrogen chloride at about zero degrees centigrade is productive of 2α,6α-dimethyl-9α-chloro-11β,17α-dihydroxy-21-acetoxy-4-pregnene-3,20-dione. These latter two compounds, and especially the 9α-fluoro compound, possess an especially high order of glucocorticoid activity. Preparation of these compounds is illustrated in the examples which follow.

The novel 2α,6α-dimethyl-11β,17α,21-trihydroxy-4-pregnene-3,20-dione and 21-esters thereof of this invention and 9α-fluoro and 11-keto analogues thereof are useful as pharmacological compositions or mixtures, e.g., stable suspensions or suspensions readily resuspendible, to be injected for the treatment of rheumatoid ailments of the animal organism. The compounds of this invention can also be administered orally or used in topical preparations such as ointments, creams, lotions or the like for treatment of inflammatory conditions of the skin, eye, ear and the like.

In carrying out the condensation step (I→II), 11β,21-dihydroxy-6-methyl-4,17(20)-pregnadien-3-one or 21-ester thereof (preferably the 6α-epimer) is admixed with the selected alkali-metal condensation catalyst and dialkyl ester of oxalic acid, or carbonic acid or alkyl ester of trifluoroacetic or formic acid in an organic solvent therefor, the order of mixing being non-critical, to produce the alkali-metal salt of a compound represented by Formula II wherein R is a hydrogen or the acyl radical of a carboxylic acid and the 2-alkoxyoxalyl group can be formyl, —COO-lower-alkyl or $CF_3CO$—, respectively. The free enol is conveniently prepared by the neutralization of an aqueous solution of an alkali-metal enolate thereof, thus precipitating the free enol. Preferred starting steroids are those represented by Formula I wherein R is the acyl radical of a hydrocarbon carboxylic acid containing from one to twelve carbon atoms, inclusive, especially aliphatic acids containing from one to eight carbon atoms, inclusive, preferably acetic or those of the dicarboxylic acids previously mentioned.

Reaction solvents which can conveniently be employed in the condensation include benzene, toluene, xylene, and like aromatic hydrocarbons, methanol, ethanol, isopropyl alcohol, tertiary butyl alcohol, and other alcohols, tetrahydrofuran, dioxane, diethyl ether, Skellysolve B hexane hydrocarbons and other aliphatic hydrocarbons, mixtures of these solvents, and other essentially non-reactive solvents. Benzene, with or without small percentages of added alkanol, or tertiary butyl alcohol are usually the preferred solvents.

The condensation is usually conducted at a temperature between about zero degrees centigrade and the boiling point of the reaction mixture. Usually the reaction proceeds with satisfactory rapidity at between about room temperature and about seventy degrees centigrade, and temperatures substantially above or below this range are therefore usually not employed. However, when other than the methyl or ethyl ester of formic, carbonic or oxalic acid or when bases weaker than sodium methoxide or ethoxide are employed, temperatures substantially higher than the preferred range may be required to obtain a satisfactory yield of carbonyl substituted product.

The time necessary to obtain substantially complete reaction varies considerably between about five minutes and several days, depending upon the reaction solvent, the reaction temperature, the selected ester of formic, carbonic, $CF_3COOH$ or oxalic acid, and the alkali-metal condensation catalyst employed, the moisture present in the reaction, and the molar ratios of the reactants. When sodium methoxide, methyl or ethyl formate, carbonate or oxalate and tertiary butyl alcohol are employed at about fifty degrees centigrade, the reaction is usually more than half completed in a few minutes.

The condensation step is usually carried out in the absence of any significance amounts of water in any form in the reaction, as would be expected in a reaction of this type. To ensure the essentially complete exclusion of water from the reaction mixture, the solvent is usually carefully dried.

Alkali-metal condensation catalysts include the alkali-metal alkoxides, e.g., sodium methoxide, sodium ethoxide, sodium isopropoxide, potassium tertiary butoxide, lithium methoxide, and the like, the alkali metals, the alkali-metal hydrides, alkali-metal amides and alkyl alkali metals, e.g., sodium amide, triphenyl methyl sodium, and the like. Of these, the alkali-metal alkoxides, especially sodium methoxide and sodium ethoxide, are preferred for their convenience and consistently satisfactory results. The alkali-metal alkoxide may be used solvent-free, dissolved or suspended in a non-reactive solvent, or in situ in the alkanol in which said alkali-metal alkoxide was prepared. When potassium is used, it is usually used as the solution formed by its reaction with tertiary butyl alcohol according to procedure well known in the art.

The theoretical alkali-metal condensation catalyst required is one mole per mole of steroid. Somewhat more than the theoretical amount is usually employed, however.

The presence, of substantially greater than one molar equivalent of alkyl ester formic, carbonic, trifluoroacetic or of oxalic acid, per mole of starting steroid, is also advantageous and promotes rapid completion of the reaction. The reaction is therefore usually carried out in the presence of greater than about one molar equivalent of the selected ester. Esters, preferably of oxalic acid, which are conveniently employed in the process of the present invention include the lower-alkyl esters, e.g., methyl, ethyl, and the propyl, butyl, isobutyl, amyl, hexyl, heptyl, and octyl esters of formic, carbonic or oxalic acid, and the like. Since the methyl and ethyl esters appear to undergo condensation with the starting steroid the most rapidly, these esters are usually employed with methyl oxalate and ethyl oxalate as shown above being especially preferred.

The thus-produced alkali-metal enolate can be separated by the addition of a large volume of an organic solvent in which the alkali-metal enolate is insoluble, such as ether, pentane, or benzene, for example. Another method of producing a somewhat purer alkali-metal enolate comprises acidification of a cold aqueous solution of the thus-precipitated alkali-metal enolate to precipitate the free enol and then treating a solution of the free enol in ether or benzene with a chemical equivalent of sodium methoxide, thus reprecipitating the sodium enolate. When the condensation is carried out in the presence of substantial amounts of methyl or ethyl alcohol, the removal of said alcohol by distillation at reduced pressure before the addition of an additional amount of solvent is preferred, if a high yield of isolated product is to be obtained.

The methylation involves the alkylation of the alkali-metal salt of a 2-carbonyl-6α-methyl-11β-hydroxy-21-oxy-4,17(20)-pregnadien-3-one such as represented by Formula II with a methyl halide wherein the halogen is bromine or iodine, to produce 2-carbonyl-2,6α-dimethyl-11β,21-dihydroxy-4,17(20)-pregnadien-3-one represented by Formula III.

The alkali-metal salt of a compound represented by Formula II can be in the form of the pure isolated alkali-metal salt of the product of the condensation reaction (II), e.g., potassium, lithium or sodium salt, or in the form of a solution of the free active-methylene compound (II) mixed with an alkali-metal alkylation catalyst, e.g., the alkali-metal alkoxides, preferably containing from one to eight carbon atoms, inclusive, e.g., sodium methoxide, sodium ethoxide, lithium methoxide, potassium tertiary butoxide, etc., the alkali-metals, the alkali-metal hydrides, the alkali-metal amides, triphenylmethyl sodium, the alkali-metal carbonates, e.g., sodium or potassium carbonate, etc., i.e., a base capable of forming a salt with an active methylene compound, in solution or suspension. The presence of a molar excess of alkylation catalyst appears to be sometimes advantageous if the catalyst is relatively weak, e.g., an alkali-metal carbonate.

The usual reaction conditions and solvents employed in the alkylation of an active methylene compound are employed in the methylation process. The reaction is usually continued for several hours, e.g., about eight to about 72, at a reaction temperature of about room temperature although higher reaction temperatures shorten this reaction time considerably.

A convenient method of methylation involves the addition of the selected methyl halide to the reaction product resulting from the condensation step, preferably after the decomposition of any excess alkali-metal condensation catalyst.

Satisfactory yields are also obtained by stirring a solution of Compound II with the methyl halide in the presence of the selected alkali-metal alkylation catalyst.

The methylation product is a 2,6α-dimethyl-2-carbonyl-11β-hydroxy-21-oxy-4,17(20)-pregnadien-3-one (III) wherein the carbonyl group is that of the starting carbonyl compound (II), the 21-oxy group is hydroxy if the starting steroid possessed a 2-hydroxy group.

The reversal step of the present invention, i.e., III→IV, involves the removal of the 2-carbonyl, i.e., formyl, carboalkoxy, trifluoroacetyl, or alkoxyoxalyl, group from the 2-position leaving the methyl group at the 2-position thus producing a 2α,6α-dimethyl-11β-hydroxy-21-oxy-4,17(20)-pregnadien-3-one represented by Formula IV.

The reversal step of the present invention is produced by the alkali-metal alkylation catalysts, in the presence of water or a lower-alkanol, i.e., the reversal is promoted by the presence of hydroxide or alkoxide ions, particularly methoxide and ethoxide ions. Thus, there is produced a 2α,6α-dimethyl-11β-hydroxy-21-oxy-4,17(20)-pregnadien-3-one of the present invention (IV).

Ordinarily, the 21-oxy group of the compound produced in the reversal is a hydroxy group (IV, R=H) since the conditions which promote the reversal of the 2-carbonyl group also promote the alcoholysis of any 21-acyloxy group to produce a 21-hydroxy. If the starting steroid for the condensation and/or alkylation step is a 21-hydroxy group, then the reaction product of the reversal step will also be a 21-hydroxy group. The more hindered 21-acyloxy groups, e.g., trimethylacetoxy, 2,6-disubstituted benzoxy, etc., will remain substantially intact during the reversal reaction whereas the unhindered groups, e.g., formoyloxy, acetoxy, and other α-unsubstituted hydrocarbon acids, etc., are almost completely converted to hydroxy groups. The degree of alcoholysis or hydrolysis of the partially hindered 21-acyloxy groups will depend, in part, upon the reaction temperature and time and reactants promoting the reversal.

The reaction product resulting from the reversal reaction will contain at least some 2α,6α-dimethyl-11β,21-dihydroxy-4,17(20)-pregnadien-3-one and frequently free 21-hydroxy steroid will be the sole reaction product, particularly if the starting steroid (I and/or II) is a 21-hydroxy compound.

It is preferred in the oxidative hydroxylation of the reaction product of the reversal reaction that all the starting steroid for the oxidative hydroxylation be 21-acyloxy steroid (V). The reaction product (IV) is therefore reacted with an esterification agent.

The esterification step of the process of the present invention involves the conversion of the 21-hydroxy group of a 2α,6α-dimethyl-11β,21-dihydroxy-4,17(20)-pregnadien-3-one (IV) to a 21-ester group (V). This can be performed under the esterification conditions known in the art, e.g., by the reaction of IV with the selected acid anhydride or acid chloride, preferably in the presence of pyridine, alkylpyridine or other N-cycloaromatic tertiary amine; with the free acid, e.g., formic acid or a weaker acid in the presence of an esterification catalyst, e.g., para-toluenesulfonic acid or sulfuric acid; with an ester by ester interchange reaction; or by reaction with the ketene of the selected acid.

Since the 11β-hydroxy group is relatively labile, reaction conditions which are not apt to cause dehydration, or alteration in some other manner, of the 11β-hydroxy group are preferred. The preferred esterification reagent is an acetylating agent, e.g., acetic anhydride, preferably in the presence of pyridine, producing a compound represented by Formula V wherein Ac is acetyl.

The oxidative hydroxylation step of the present invention consists of the reaction of a 2α,6α-dimethyl-11β-hydroxy-21-acyloxy-4,17(20)-pregnadien-3-one (V) with a hydroxylating agent and an oxidizing agent to produce a 2α,6α-dimethyl-11β,17α-dihydroxy-21-acyloxy-4-pregnene-3,20-dione (VI).

In this reaction, a metal oxide is ordinarily employed in catalytic amounts to add to the double bond. Osmium tetroxide is ordinarily the metal oxide of choice.

Oxidizing agents which can be employed in the oxidative hydroxylation step of the present invention are the oxidizing agents which contribute an oxygen atom to the reaction and include hydrogen peroxide, alkyl peroxides, peracids, chloric acid, periodic acid, acetyl peroxide, benzoyl peroxide, tertiary amine oxide peroxides, aryliodo oxides, lead tetra-acetate, mercury diacetate, etc., i.e., oxygen-donating oxidizing agents. The use of hydrogen peroxide, an amine oxide peroxide or an aryliodo oxide as the oxidizing agent in the oxidative hydroxylation of the present invention is preferred. The use of these reagents is discussed more fully below.

The amine oxide peroxides which can be employed in the oxidative hydroxylation step of this invention are prepared by the reaction of some tertiary amines with two molar equivalents of hydrogen peroxide or by the reaction of a tertiary amine oxide with one molar equivalent of hydrogen peroxide.

The amine oxide peroxides of the present invention are preferably non-aromatic, e.g., the N-alkylcycloalkylamines oxide peroxides, e.g., N-alkylmorpholine oxide peroxide, N-alkylpyrrolidine oxide peroxides, and N-alkylpiperidine oxide peroxides, the trialkylamine oxide peroxides, e.g., trimethylamine oxide peroxide, triethylamine oxide peroxide, methyldiethylamine oxide peroxide, ethyldimethylamine oxide peroxides, the alkanolamine oxide peroxides, e.g., dimethylethanolamine oxide peroxide, pyrrolidylethanol oxide peroxide, piperidylethanol oxide peroxide, etc. Of these amine oxide peroxides, triethylamine oxide peroxide and N-methylmorpholine oxide peroxide are especially advantageous.

The organic polyvalent iodo oxides which can be employed in the oxidative hydroxylation step of this invention include iodoso, iodyl and iodoxy compounds and salts thereof. The iodonium compounds are not included in the term "iodo oxides" as used herein since the hydroxy group of the iodonium compounds is ionic in nature and is not therefore directly attached to the iodine atom, but merely associated with it ionically. The iodoso compounds have one oxygen atom attached to the iodine atom; the iodoxy compounds have two oxygen atoms attached.

Examples of aryl iodo oxides include iodosobenzene, phenyliodosoacetate, diphenyliodyl hydroxide and acetate, phenyliodosopropionate, iodoxybenzene, the ring alkylated iodoso and iodoxybenzenes, and the oxides of iodonaphthylene, iodobenzoquinone and iodoanthroquinone, iodobenzoic acid, iodobenzenesulfonic acid, iodobenzaldehyde, iodobenzophenone, iodosalicylic acid, etc.

In carrying out the oxidative hydroxylation step of the invention, the starting steroid is advantageously dissolved in an inert organic solvent, for example, tertiary butyl alcohol, diethyl ether, tetrahydrofuran, or the like, and the hydroxylating agent preferably osmium tetroxide and the oxidizing agent mixed therein. Advantageously, though not necessarily, the hydroxylating agent is added after the addition of the oxidizing agent. Advantageously also, the osmium tetroxide and the oxidizing agent peroxide are added in solutions of the same solvent used as the vehicle used for the reaction.

The amount of preferred osmium tetroxide hydroxylating agent employed in the reaction can be varied widely, for example, from about 0.2 molar equivalent to 0.001 molar equivalent. Advantageously, however, not more than 0.05 molar equivalent is used.

The amount of oxidizing agent theoretically required to produce a 17-hydroxy-20-keto-21-acyloxy steroid is two oxidizing equivalents for each mole of osmate ester formed in the reaction. It has been found, however, that in the process of this invention, more than the theoretical amount of oxidizing agent is ordinarily necessary to obtain a complete reaction. For optimum results in the process of this invention, therefore, it is usually necessary to use the oxidizing agent in excess of the theoretical amount. For example, optimum results are ordinarily obtained using between about 2.2 and about 2.75 equivalents of amine oxide peroxide or aryl iodo oxide, calculated on the starting steroid. The course of the oxidative hydroxylation reaction can be readily determined by the titration of aliquot portions for residual oxidizing agent. Ordinarily, the presence of small amounts of water in the reaction mixture does not adversely effect the yield of desired product. However, to ensure optimum yields of desired product when employing hydrogen peroxide or an amine oxide peroxide, the reaction advantageously may be performed under substantially anhydrous conditions, e.g., in dry tertiary butyl alcohol, or like solvent.

The reaction temperature for the oxidative hydroxylation step normally is between about fifteen and about thirty degrees centigrade although higher or lower temperatures are operable, e.g., between about minus ten and about plus seventy degrees centigrade. In place of the solvents noted above, there may be used any inert solvent which is a solvent for the reagents. Suitable solvents include diethylether, dioxane, isopropylalcohol, tetrahydrofuran, tertiary butyl alcohol, tertiary amyl alcohol, ethanol and methanol.

Furthermore, according to the present invention, 2α,6-dimethylhydrocortisone and the 21-acylates preferably 2α,6α-dimethylhydrocortisone 21-acylate thereof and the 9α-halo derivatives thereof, previously described, can be transformed into their 1-dehydro analogues by subjection to the fermentative action of a fungus of the genus Septomyxa, preferably *Septomyxa affinis,* more completely described as *Septomyxa affinis* (Sherb.) Wr, American Type Culture Collection 6737, a member of the class of Deuteromyces, Fungi imperfecti. The 1,4-dehydrogenated compounds thus-produced possess glucocorticoid activity and are useful in the treatment of rheumatoid diseases as they occur in the animal organism.

In addition to the compounds mentioned above, the biological 1-dehydrogenation process can also be carried out with 2α,6α-dimethyl-11β-hydroxy-21-acyloxy-4,17-(20)-pregnadien-3-one and the corresponding free 21-hydroxy compound represented above by Formula IV. In this case, the product is 2,6α-dimethyl-11β,21-dihydroxy-1,4,17(20)-pregnatrien-3-one which can be 21-acylated by the process described above and subsequently oxidatively hydroxylated to yield 2,6α-dimethyl-11β,17α,21-trihydroxy-1,4-pregnadiene-3,20- dione as the free hydroxy compound or its 21-acylate as explained in the foregoing paragraph.

The 1-dehydrogenation of the novel 2α,6α-dimethyl steroids of this invention can also be effected chemically by the action of selenium dioxide under the conditions known to 1-dehydrogenated hydrocortisone or its 21-acylates.

The 1-dehydrogenation can be carried out under the conditions described in Belgian Patent 545,877. In general, the fermentation is carried out under submerged aerobic conditions in a medium containing the novel 2,6α-dimethyl steroid in the presence of assimilable nitrogen, assimilable carbon and the necessary trace elements. The time of fermentation can be from eight to 72 hours, 24 hours being generally satisfactory, whereupon the resulting 1-dehydrogenated product can be recovered from the reaction mixture by the method disclosed in the aforementioned patent. Thus, 2α,6α-dimethylhydrocortisone (or
2α,6α-dimethylhydrocortisone 21-acetate),
2α,6α-dimethylcortisone,
2α,6α-dimethyl-9α-bromo-11β,17α-dihydroxy-21-acetoxy-4-pregnene-3,20-dione,
2α,6α-dimethyl-9α-fluoro-11β,17α-dihydroxy-21-acetoxy-4-pregnene-3,20-dione and
2α,6α-dimethyl-11β,21-dihydroxy-4,17(20)-pregnadien-3-one are converted to
2,6α-dimethyl-11β,17α,21-trihydroxy-1,4-pregnadiene-3,20-dione,
2,6α-dimethyl-17α,21-dihydroxy-1,4-pregnadiene-3,11,20-trione,
2,6α-dimethyl-9α-bromo-11β,17α,21-trihydroxy-1,4-pregnadiene-3,20-dione,
2,6α-dimethyl-9α-fluoro-11β,17α,21-trihydroxy-1,4-pregnadiene-3,20-dione and
2,6α-dimethyl-11β,21-dihydroxy-1,4,17(20)-pregnatrien-3-one, respectively.

The following examples are illustrative of the process and products of the present invention, but are not to be construed as limiting.

EXAMPLE 1

*2-ethoxyoxalyl-6α-methyl-11β,21-dihydroxy-4,17(20)-pregnadien-3-one sodium-enolate*

The starting material (I), 6α-methyl-11β,21-dihydroxy-4,17(20)-pregnadien-3-one 21-acetate, is prepared as disclosed in J.A.C.S. 78, 6213. In an atmosphere of nitrogen, 0.76 gram of ethyl oxalate followed by 0.205 gram of sodium methoxide (25 percent solution in methanol) was added to a solution of 1.0 gram of I dissolved in sixteen milliliters of t-butanol. The temperature of addition was 65 degrees centigrade, and the reaction mixture was allowed to stir for a period of ten to fifteen minutes during which period the temperature dropped to 25 degrees centigrade. Sixteen milliliters of ether was added, and stirring was continued for an additional period of thirty minutes. The product, 2-ethoxyoxalyl-6α-methyl-11β,21-dihydroxy-4,17(20)-pregnadien-3-one sodium enolate, was filtered and washed with ether. It was recovered as a yellow, crystalline solid, yield 1.3 grams.

EXAMPLE 2

*2-ethoxyoxalyl-2,6α-dimethyl-11β,21-dihydroxy-4,17(20)-pregnadien-3-one*

A reaction mixture was prepared consisting of 1.3 grams of 2-ethoxyoxalyl-6α-methyl - 11β,21 - dihydroxy-4,17(20)-pregnadien-3-one sodium enolate, 1.5 grams of potassium carbonate, 4.5 milliliters of methyl iodide and thirty milliliters of acetone. The mixture was allowed to stir for 66 hours and was then diluted with 100 milliliters of water and extracted with methylene chloride. The extract was washed with salt water, dried and evaporated to a solid residue. The residual product, 2-ethoxyoxalyl-2,6α - dimethyl -11β,21-dihydroxy-4,17(20)-pregnadien-3-one, was a light-colored, crystalline material.

In place of methyl iodide in the above procedure, other alkyl halides can be used, e.g., methyl bromide, ethyl bromide, butyl bromide, hexyl bromide, octyl bromide, phenyl bromide, etc., to produce the corresponding 2-alkylated or 2-phenylated product, e.g., 2-ethoxyoxalyl-2-ethyl-6α-methyl-11β,21-dihydroxy-4,17(20) - pregnadien-3-one, and the like.

EXAMPLE 3
*2α,6α,dimethyl-11β,21-dihydroxy-4,17(20)-pregnadien-3-one*

A reaction mixture was composed of the total product of Example 2 above dissolved in twenty milliliters of methanol and the resulting solution added to a solution of 0.8 milliliter of 25 percent sodium methoxide dissolved in methanol. The reaction mixture was stirred under an atmosphere of nitrogen for a period of two hours and was then diluted with 100 milliliters of water and extracted with methylene chloride. The extract was washed with salt water, dried and evaporated to an oily residue, 2α,6α-dimethyl-11β,21-dihydroxy-4,17(20)- pregnadien-3-one.

EXAMPLE 4
*2α,6α-dimethyl-11β-hydroxy-21-acetoxy-4,17(20)-pregnadien-3-one*

A reaction mixture was composed of the entire product of Example 3 above dissolved in five milliliters of pyridine to which was added ten milliliters of acetic anhydride. The reaction mixture was permitted to stand for a period of seventeen hours and was then poured into ice water. The resulting oil was extracted with methylene chloride, and the extract washed successively with dilute hydrochloric acid, dilute sodium bicarbonate, and water. The solution was then dried and chromatographed on synthetic magnesium silicate. The column was eluted with five percent acetone-95 percent commercial hexane. Evaporation of the solvent yielded a crystalline residue which was recrystallized from dilute methanol to give pure 2α,6α-dimethyl-11β-hydroxy-21-acetoxy-4,17(20)-pregnadien-3-one, melting point 106 to 108 degrees centigrade; $[\alpha]_D^{25}+96$ degrees (in chloroform);

$$\lambda_{max}^{alcohol}\ 241\mu$$

$a_M$=14,525.

*Analysis.*—Calculated for $C_{25}H_{36}O_4$: C, 74.96; H, 9.06. Found: C, 74.72; H, 9.10.

Substituting other acid anhydrides or halides for the acetic anhydride in the foregoing example is productive of the corresponding 2α,6α-dimethyl-11β-hydroxy-21-acetoxy-4,17(20)-pregnadien-3-one, wherein the acyl group is the acyl radical of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, the optically active abietic, α-ethylisovaleric, an acyclic acid, e.g., 3β-hydroxycholanic, 3β-hydroxyetiocholanic, cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2-, 3- or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium, salts), e.g., succinic, glutaric, α-methylglutaric, β-methylglutaric, β,β-dimethylglutaric, adipic, pimelic, suberic, a hydroxyacid, e.g., glycolic, lactic, citric, tartaric, d-malic, d-glyceric, mannonic, gluconic, salicylic, an aminoacid, e.g., glycine, diglycollamic, triglycollamic, methylglycine, dimethylglycine, diethylglycine, para-aminosalicylic, para-aminobenzoic, other hetero-substituted acids, e.g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α - napthoxyacetic, β - pyrrolidylpropionic, carbamic acids, e.g., carbamic acid, phenylcarbamic, n-butylcarbamic, dimethylcarbamic, diethylcarbamic, allophanic, or a heterocyclic acid, e.g., β-furylcarboxylic, N-methylpyrrolidyl-2-carboxylic, α-picolinic, indole-2-carboxylic, 6-hydroxyindolyl-3 - acetic, N - methylmorpholyl-2-carboxylic, lysergic, pyrrolyl-2-carboxylic, or other acyl acid.

Alternatively, the 21-hydroxy group of the 2α-methyl-11β,21-dihydroxy-4,17(20)-pregnadien-3-one can be converted to another 21-derivative, leaving the remainder of the molecule unchanged. Examples of such 21-derivatives are 21-ethers, e.g., 21-methoxy, ethoxy, benzyloxy, propoxy, α-tetrahydropyranyloxy, (β-carbethoxy-β-cyano)-ethylenoxy, β,β-dicarbethoxyethyloxy, β-ketocyclohexenyloxy, β-trichloro-α-acetylethoxy, chloromethoxy, dimethylmethoxy, diethylmethoxy, dimethylethoxy, diethylethoxy, 21-thioesters, e.g., acetylmercapto, β-cyclopentylpropionylmercapto, triethylacetylmercapto, trimethylacetylmercapto, propionylmercapto, 21-thione esters, e.g., thioacetyloxy, thiopropionyloxy, thio-β-cyclopentylpropionyloxy, thiotriethylacetyloxy, thiotrimethylacetyloxy, imido derivatives of acetyl esters, e.g., acetimido-oxy, 21-esters of mineral acids, e.g., 21-phosphate, 21-sulfonate, 21-sulfinate, 21-methylphosphate, 21-methylsulfonate, 21-methylsulfinate, 21-bromo, fluoro and 21-chloro, esters of the carbonic acids, e.g., 21-carbonate, 21-(triethoxy)methoxy, 21-sulfonyloxy, e.g., 21-para-toluenesulfonyloxy, etc.

EXAMPLE 5
*2α,6α-dimethylhydrocortisone acetate*

A reaction mixture was composed by preparing a solution of 0.423 gram of 2α6α-dimethyl-11β-hydroxy-21-acetoxy-4,17(20)-pergnadien-3-one in twenty milliliters of t-butanol, adding 2.5 milliliters of pyridine, 1.7 milliliters of n-methylmorpholine oxide peroxide and two milligrams of osmium tetroxide. The reaction mixture was stirred at about 22 degrees centigrade for eighteen hours and then concentrated to one-half its volume under reduced pressure. The reaction mixture was then diluted with twenty milliliters of distilled water and extracted with methylene chloride. The extract was washed successively with cold dilute hydrochloric acid, cold sodium bicarbonate, and water, and was then dried and evaporated to an oil (0.44 gram). The oil was dissolved in forty milliliters of methylene chloride and adsorbed on a column of synthetic magnesium silicate. The column was developed with thirty milliliter fractions of Skellysolve B hexanes plus acetone according to the following:

| Fraction No.: | Solvent |
|---|---|
| 1–5 | Hexane + 5% acetone |
| 6–10 | Hexane + 7.5% acetone |
| 11–15 | Hexane + 10% acetone |
| 16–20 | Hexane + 15% acetone |
| 21–25 | Hexane + 20% acetone |

Fractions 10 through 16 (79 milligrams) were combined, and recrystallized twice from ethyl acetate-hexane. The product, 33 milligrams, was pure 2α,6α-dimethylhydrocortisone acetate, melting point 187 to 193 degrees centigrade. The infrared spectrum was in agreement with the structure:

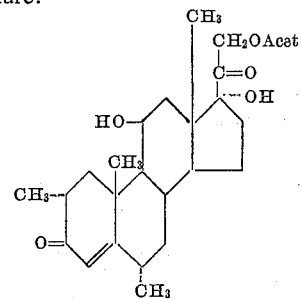

Substituting other esters of 2α,6α-dimethyl-11β,21- dihydroxy-4,17(20)-pregnadien-3-one in the process of Example 5 such as the 21-propionate, 21-phenylpropionate, and the 21-hemisuccinate, is productive of the corresponding esters of 2α,6α-dimethylhydrocortisone, i.e., the 21-propionate, 21-phenylpropionate and 21-hemisuccinate.

EXAMPLE 6

*2α,6α-dimethylcortisone acetate*

A solution was prepared containing one-half milliliter of acetic acid, 25 milligrams of 2α,6α-dimethylhydrocortisone acetate, ten milligrams of chromic anhydride and approximately fifty milligrams of distilled water. The mixture was shaken several times at about 22 degrees centigrade and permitted to stand for several hours. The reaction mixture was poured into ten milliliters of water and refrigerated for twenty hours at about five degrees centigrade. The steroid product which crystallized from the aqueous mixture was collected and recrystallized twice from acetone to give light-colored crystals of 2α,6α-dimethylcortisone acetate.

EXAMPLE 7

*2α,6α-dimethylhydrocortisone*

A reaction mixture was prepared by dissolving 0.10 gram of 2α,6α-dimethylhydrocortisone acetate, prepared as in Example 5, in ten milliliters of methanol and removing oxygen from the solution by sweeping with nitrogen. A hydrolyzing solution was prepared by dissolving 0.10 gram of potassium bicarbonate in one milliliter of water and removing oxygen therefrom by bubbling nitrogen therethrough. The two solutions were mixed and held for several hours at room temperature whereupon excess basicity was neutralized with acetic acid. The product of the hydrolysis, 2α,6α-dimethylhydrocortisone, was recovered from the solution by absorption on magnesium silicate and eluting with a mixture of hexane plus acetone. The product was recovered as colorless crystals by evaporating the eluate to a solid residue and recrystallizing from a mixture of ethyl acetate and hexanes.

EXAMPLE 8

*2α,6α-dimethyl-17α,21-dihydroxy-4,9(11)-pregnadiene-3,20-dione 21-acetate*

A reaction mixture was prepared by dissolving 500 milligrams of 2α,6α-dimethylhydrocortisone acetate in five milliliters of pyridine and adding 225 milligrams of N-bromoacetamide in an atmosphere of nitrogen. The mixture was permitted to stand at about 22 degrees centigrade under nitrogen for a period of thirty minutes whereupon it was cooled to ten to fifteen degrees centigrade and sulfur dioxide gas was passed over the surface while shaking the mixture until the solution gave no color with acidified starch-iodine paper. The temperature was kept below thirty degrees centigrade during the addition. After standing at room temperature for a period of fifteen minutes, the reaction was poured into ice water and the resulting precipitate extracted with fifty milliliters of ether. The ether extract was washed successively with dilute hydrochloric acid and water, dried and evaporated to a solid residue. The residue, 2α,6α-dimethyl-17α,21-dihydroxy-4,9(11)-pregnadiene-3,20-dione 21-acetate, was purified by recrystallization from a mixture of acetone and hexane.

EXAMPLE 9

*2α,6α-dimethyl - 9α - bromo - 11β,17α,21-trihydroxy-4-pregnene-3,20-dione 21-acetate (2α,6α-dimethyl-9α-bromohydrocortisone 21-acetate)*

A reaction mixture was prepared by dissolving 330 milligrams of 2α,6α-dimethyl-17α,21-dihydroxy-4,9(11)-pregnadiene-3,20-dione 21-acetate in five milliliters of methylene chloride and ten milliliters of t-butanol, and adding a solution of 0.83 milliliter of 72 percent perchloric acid dissolved in 5.8 milliliters of water. To the mixture was then added a solution of 142 milligrams of N-bromoacetamide dissolved in 2.5 milliliters of t-butanol. The reaction mixture was stirred for fifteen minutes whereupon a solution of 142 milligrams of sodium sulfite dissolved in seven milliliters of water was added and the reaction mixture was concentrated to a volume of about 25 milliliters under reduced pressure at about sixty degrees centigrade. The concentrated mixture was cooled in an ice bath with stirring and fifty milliliters of water was added, whereupon the crystalline product, 2α,6α-dimethyl-9α-bromo-11β,17α,21 - trihydroxy-4-pregnene-3,20-dione 21-acetate, was separated as a light-colored, crystalline solid.

EXAMPLE 10

*2α,6α-dimethyl-9β,11β-oxido-17α,21-dihydroxy-4-pregnene-3,20-dione 21-acetate*

A reaction mixture was prepared by dissolving 400 milligrams of 2α,6α-dimethyl-9α-bromo-11β,17α,21-trihydroxy-4-pregnene-3,20-dione 21-acetate in fifty milliliters of acetone and adding 400 milligrams of potassium acetate. The resulting suspension was heated under reflux for a period of eighteen hours and the mixture then concentrated to a volume of five milliliters on the steam bath. Ten milliliters of water was added to the mixture and the resulting crystalline product was separated by filtration and recrystallized from acetone to give light-colored crystals of 2α,6α-dimethyl-9β,11β-oxido-17α,21-dihydroxy-4-pregnene-3,20-dione 21-acetate.

EXAMPLE 11

*2α,6α-dimethyl - 9α - fluoro - 11β,17α,21-trihydroxy-4-pregnene-3,20 - dione 21-acetate (2α,6α-dimethyl-9α-fluorohydrocortisone 21-acetate)*

A reaction mixture was prepared by dissolving 230 milligrams of 2α,6α-dimethyl-9β,11β-oxido-17α,21-dihydroxy-4-pregnene-3,20-dione 21-acetate in five milliliters of methylene chloride and adding 1.2 milliliters of a 48 percent solution of hydrogen fluoride. The reaction mixture was stirred for a period of twenty hours while cooling and then diluted with fifteen milliliters of methylene chloride and poured into forty milliliters of distilled water dissolved therein four grams of sodium bicarbonate. The methylene chloride phase was separated and the water phase extracted with fresh methylene chloride. The methylene chloride solutions were combined, dried, diluted with 25 milliliters of ether and adsorbed on a column of synthetic magnesium silicate. The column was eluted with a methylene chloride-ether (3:1) mixture followed by successive portions of hexane containing progessively increasing amounts of acetone (ranging from ten to fifty percent). The fractions eluated by hexane mixtures containing up to twenty percent acetone were combined, evaporated to a solid residue and the residue recrystallized from a mixture of acetone and hexane followed by a further recrystallization from methylene chloride to give pure 2α,6α-dimethyl-9α-fluoro - 11β,17α,21-trihydroxy-4-pregnene-3,20-dione 21-acetate, a light-colored, crystalline product.

EXAMPLE 12

*2α,6α-dimethyl-9α-fluoro-11β,17α,21-trihydroxy-4-pregnene-3,20-dione*

Following the procedure of Example 7, 2α,6α-dimethyl-9α - fluoro - 11β,17α,21 - trihydroxy - 4 - pregnene - 3,20-dione 21-acetate obtained as in Example 11 was hydrolyzed to produce pure crystalline 2α,6α-dimethyl-9α-fluoro-11β,17α,21-trihydroxy-4-pregnene-3.20-dione.

EXAMPLES 13–16

*1-dehydrogenation with Septomyxa affinis*

Three 400-milliliter portions of glucose-corn steep liquor medium having a pH of 4.6 and containing 1.0 gram of glucose per 100 milliliters and 2.0 grams of corn steep liquor solids per 100 milliliters, were inoculated with *Septomyxa affinis*, ATCC 6737, and incubated in shaken flasks at room temperature for 48 hours. During this period a heavy fungal growth developed. Twenty-four liters of the same medium, to which was added twenty milliliters of lard oil, containing 0.1 percent octadecanol as defoamer, was inoculated with the combined volume of 1200 milliliters of medium containing the fungal growth. Incubation of the resulting mixture was carried out at 28 degrees centigrade with constant agitation and aeration for a period of 24 hours whereupon the medium was divided into four equal portions labeled A through D. To portion A was slowly added 500 milligrams of $2\alpha,6\alpha$-dimethyl-$11\beta$-hydroxy-21-acetoxy-4,17(20)-pregnadien-3-one dissolved in sixty milliliters of propylene glycol. To portion B was slowly added 500 milligrams of $2\alpha,6\alpha$-dimethylhydrocortisone acetate dissolved in sixty milliliters of propylene glycol. To portion C was slowly added 500 milligrams of $2\alpha,6\alpha$-dimethylcortisone acetate dissolved in sixty milliliters of propylene glycol. To portion D was slowly added 500 milligrams of $2\alpha,6\alpha$-dimethyl-$9\alpha$-fluoro-$11\beta$,$17\alpha$,21-trihydroxy-4-pregnene-3,20-dione 21-acetate dissolved in sixty milliliters of propylene glycol. Fermentation of the four portions was continued for three days after which time the beers were extracted with chloroform under reflux. The extract of each portion was cooled and evaporated to a solid residue and the residue dissolved in 500 milliliters of ethylene dichloride. The solution was then separated chromatographically on synthetic magnesium silicate. The adsorbed material was eluted with successive portions of ethylene dichloride containing increasing amounts of acetone up to a 50:50 mixture at the eighteenth portion. The eluate portions ranging approximately ten percent acetone were evaporated to a solid residue containing respectively for portion A, $2,6\alpha$-dimethyl-$11\beta$,21-dihydroxy-1,4,17(20)-pregnatrien-3-one; portion B, 1-dehydro-$2,6\alpha$-dimethylhydrocortisone; portion C, 1-dehydro-$2,6\alpha$-dimethylcortisone; and portion D, $2,6\alpha$-dimethyl-$9\alpha$-fluoro-$11\beta$,$17\alpha$,21-trihydroxy-1,4-pregnadiene-3,20-dione.

It is to be understood that the invention is not to be limited to the exact details of operation or exact compounds shown and described, as obvious modifications and equivalents will be apparent to one skilled in the art, and the invention is therefore to be limited only by the scope of the appended claims.

This application is a continuation-in-part of our co-pending application Serial No. 668,865, filed July 1, 1957, now abandoned.

We claim:
1. $2\alpha,6\alpha$-dimethylhydrocortisone.
2. $2\alpha,6\alpha$-dimethylhydrocortisone 21-acylate wherein the acyl radical is a hydrocarbon carboxylic acid of from one to twelve carbon atoms, inclusive.
3. $2\alpha,6\alpha$-dimethylhydrocortisone 21-acetate.

References Cited in the file of this patent

UNITED STATES PATENTS

| | | |
|---|---|---|
| 2,852,538 | Scheri et al. | Sept. 16, 1958 |
| 2,867,633 | Lincoln et al. | Jan. 6, 1959 |
| 2,867,636 | Lincoln et al. | Jan. 6, 1959 |
| 2,897,217 | Spero | July 28, 1959 |
| 2,897,218 | Sebek et al. | July 28, 1959 |

OTHER REFERENCES

Hogg et al.: J.A.C.S., vol. 77, pages 6401–02 (1955).

UNITED STATES PATENT OFFICE

CERTIFICATE OF CORRECTION

Patent No. 3,020,297                  February 6, 1962

Frank H. Lincoln, Jr., et al.

It is hereby certified that error appears in the above numbered patent requiring correction and that the said Letters Patent should read as corrected below.

Column 3, line 36, strike out "a"; column 4, line 6, for "significance" read -- significant --; column 5, line 29, for "2-hydroxy" read -- 21-hydroxy --; column 11, line 68, for "pregenene-", in italics, read -- pregnene- --, in italics.

Signed and sealed this 5th day of June 1962.

(SEAL)
Attest:

ERNEST W. SWIDER                        DAVID L. LADD
Attesting Officer                        Commissioner of Patents